United States Patent [19]

Bryant

[11] 4,092,795
[45] June 6, 1978

[54] FISHING POLE MOUNT AND SIGNAL

[76] Inventor: Ivan L. Bryant, 1196 N. Ross La., Medford, Oreg. 97501

[21] Appl. No.: 756,277

[22] Filed: Jan. 3, 1977

[51] Int. Cl.² .............................................. A01K 97/12
[52] U.S. Cl. .......................................... 43/17; 43/21.2
[58] Field of Search ............................. 43/17, 16, 21.2

[56] References Cited

U.S. PATENT DOCUMENTS

| | | | |
|---|---|---|---|
| 2,816,388 | 12/1957 | Hartley | 43/17 |
| 2,909,860 | 10/1959 | Braun | 43/17 |
| 3,359,672 | 12/1967 | Schwartz et al. | 43/17 |
| 3,862,508 | 1/1975 | Morgan | 43/17 |
| 3,992,798 | 11/1976 | Schmitt, Sr. | 43/17 |

Primary Examiner—Edward M. Coven
Assistant Examiner—Daniel J. Leach
Attorney, Agent, or Firm—Clarence M. Crews

[57] ABSTRACT

A fishing pole mount is provided which includes a pole holding socket and which is adapted either to be planted firmly in the earth or affixed to the side of a boat, and which includes means responsive to a tug on the line to sound a signal, and to provide a regulated tension suitable to set the hook adequately but without excessive force. Provision is made for adjusting the tone of the signal so that two or more fishermen, located in proximity to one another, can each recognize by the tone of the signal which one of them has a bite. It is not desirable when a fish has been caught and reeled in to throw the fishing equipment onto the ground or into a dirty boat hold. A second pole socket is therefore provided on the mount having no signal means associated with it, for holding the pole temporarily while the fish is being removed from the hook and the hook is being re-baited.

2 Claims, 6 Drawing Figures

U. S. Patent        June 6, 1978        4,092,795
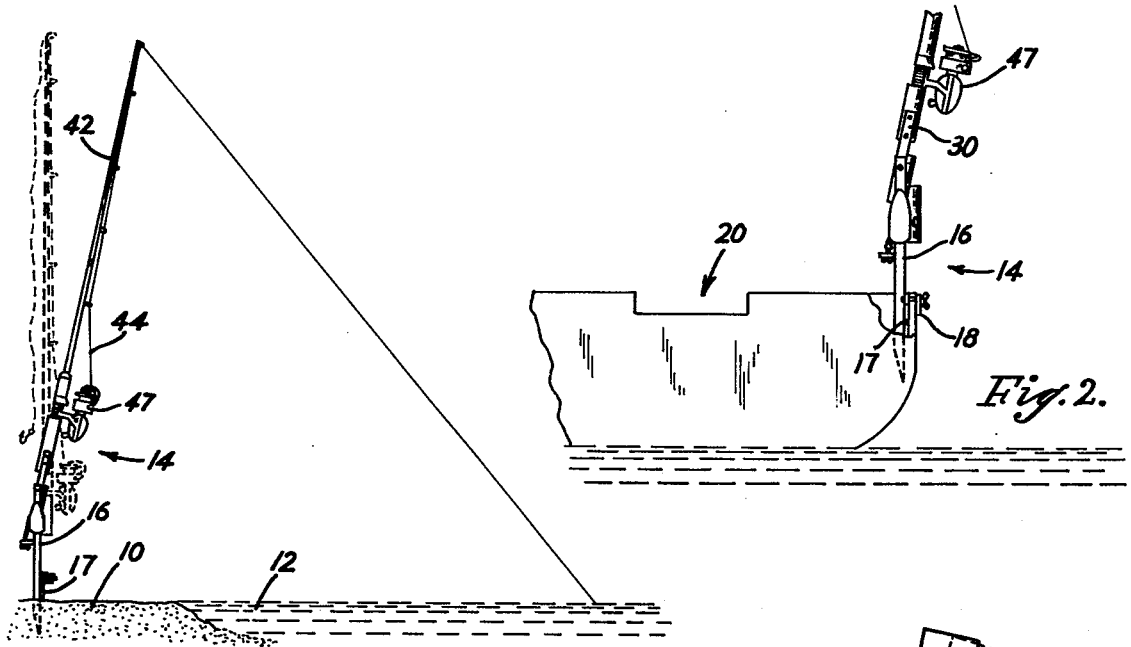
Fig.1.
Fig.2.
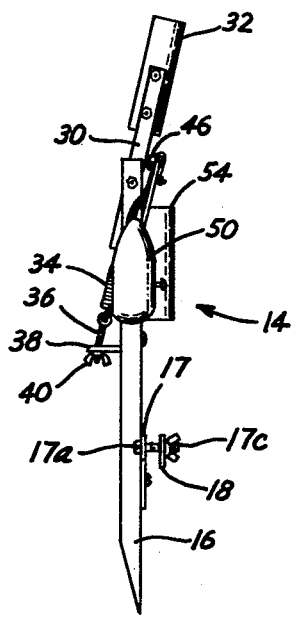
Fig.3.
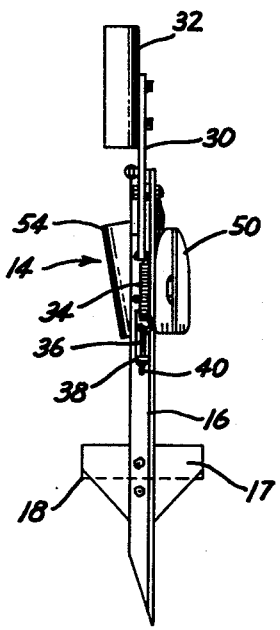
Fig.4.
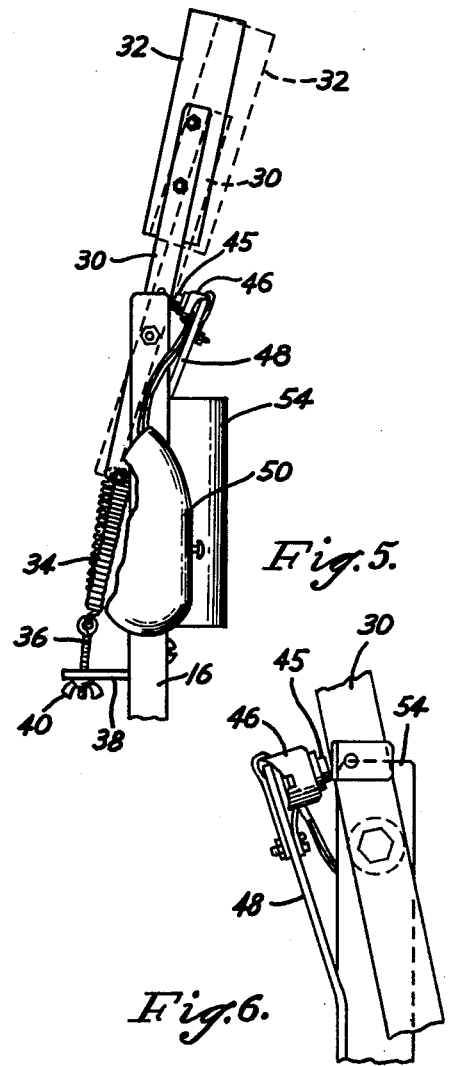
Fig.5.
Fig.6.

FISHING POLE MOUNT AND SIGNAL

This invention has to do with fishing equipment and more particularly with fishing equipment which is adapted to give an audible signal when there is a nibble or a caught fish on the line. To this end a pointed post is provided, adapted to be driven into the ground or affixed to a boat gunwale, and equipped with a pivotally mounted pole socket into which the butt end of a pole may be freely inserted, and from which it may be freely withdrawn.

The pole socket is desirably equipped with spring means which can be adjusted in tension to secure firm but moderate setting of the fish hook.

Provision is made of an electrically operated signal device, connected in an electric circuit which is adapted to be activated by a tug on the line to give an audible signal. The audible signal calls the attention of the fisherman, even of a fisherman who may have strayed away a short distance or who may have dozed off.

The circuit can be readjusted to change the tone of the signal as desired, so that two neighboring fishermen so equipped can differentiate their signals and thus avoid confusion as to which one of them has a nibble or bite.

It has been my experience in the past that most of the damage to conventional fishing equipment has occurred because there has been no place to put the equipment but on the ground. After a fisherman gets to the place where he is going to fish from the shore, he can press my novel pole holder into the ground, and from then on he has a place to put his pole so it will be kept both clean and out of the way of others who might walk or fall on it if it were lying on the ground.

In the interest of convenience, cleanliness and protection to the fishing equipment, the device is made to include a second, silent, pole holding socket, so that a fish can be removed and the hook can be re-baited without sounding a false alarm, and without having to throw the fishing equipment onto the ground or into the hold of a boat.

Other objects and advantages will hereinafter appear.

In the drawing forming part of this specification,

FIG. 1 is a view in elevation of my novel fishing equipment set up on shore, the pole being shown in a nearly vertical attitude in broken lines and in a signal sounding attitude in full lines;

FIG. 2 is a fragmentary view in elevation showing the same fishing equipment affixed to the side of a boat;

FIG. 3 is a fragmentary view in side elevation showing in further detail the novel fishing rod holder in a substantially upright attitude;

FIG. 4 shows the same structure as FIG. 3 but with the pole holder re-oriented by ninety degrees about a vertical axis;

FIG. 5, on a larger scale, shows the pole holder in full lines in a silent condition, and in broken lines in a signal sounding condition; and FIG. 6 is a fragmentary view that shows particularly how the signal is sounded.

In FIG. 1 the shore is indicated at 10 and the water at 12. A pole mount 14, composed chiefly of non-rustable metallic parts, preferably aluminum, includes a sharp pointed stake 16 in the form of an angle bar, which is adapted to be driven firmly into the ground. A vee-shaped cross plate 17, affixed to the stake 16, can be driven into the ground with the stake for opposing bodily tilting of the stake. The plate 17 can be used as a driver by placing one's foot on the plate to force the stake and the plate into the ground.

The stake 16 may also have detachably connected to it a clamping plate 18 whereby it may be rigidly affixed to the side of a boat 20. The plate 17 is placed against the inner face of the boat side. Headed screws 17a have their shanks passed successively through the plate 17, the boat side, and the plate 18, and wing nuts 17c are threaded firmly onto the screw shanks.

The clamping plate 18, the headed screws 17a, and the wing nuts 17c are simply held in reserve when the stake 16 is driven into the ground.

The stake 16 has pivotally mounted on it, near its upper end, a lever 30. The lever 30 at its upper end has affixed to it a pole butt holding socket 32.

The lower end of the lever 30 has connected to it a tension coil spring 34 whose lower end is connected to a screw-eye 36. The lower end of the screw-eye is passed through a fixed arm 38 on the stake 16. The tension of the spring is regulated by a wing nut 40 which is threaded onto the lower end of the screw-eye 36 and bears upward against the lower face of the arm 38.

A conventional fishing pole 42, conventionally equipped with a line 44 and a reel 47, has its butt end removably received in the socket 32.

So long as there is no tug upon the line the equipment described remains silent but when a fish pulls at the bait on the hook at the free end of the line the rod 42 is tilted forward, tilts the socket 32 forward, and thereby causes the socket carrying lever 30 to press against a switch button 45 for closing an electric circuit.

The button 45 forms part of a switch 46 which is fixedly supported from the stake 16 on an arm 48. The electric circuit includes one or more dry cell batteries contained in a housing 50 and a sounding signal device (not shown) which is also contained in the housing 50.

A small screw (not shown) inside the housing 50 can be turned and set to change the tone of the electrically produced signal. By virtue of this arrangement, neighboring fishermen using separate fishing units according to the invention can tune their equipment to different frequencies and test them out, so that their signals will be readily distinguishable from one another.

When a fishermen equipped with this apparatus hears his signal device, he removes his pole from the socket 32, reels in the fish and then sets the pole in a second socket 54 affixed to the stake 16. He then removes the fish in a clean condition from the line, puts it in a clean condition into a basket, rebaits the hook, and transfers the pole to the socket 32.

The reason for the second socket is not merely to provide for removal of the fish in a clean condition. The second socket can be used during the removal of the fish and re-baiting without liability of accidentally sounding a false signal. More important, he keeps his equipment clean. Of primary importance, he avoids the possibility of having his rod and line walked on by others and thereby damaged.

I have described what I believe to be the best embodiment of my invention. What I desire to cover by letters patent, however, is set forth in the appended claims.

I claim:

1. Fishing equipment comprising, in combination,
    (a) a stake adapted to be driven firmly into the ground, (b) a pole carrying socket pivotally mounted on the stake,
(c) yieldable spring means normally maintaining the socket in a datum position,
(d) an audible signalling device,
(e) means responsive to tilting of the socket by a tug on the line to sound the signalling device, and
(f) an alternative, silent socket mounted on the stake for holding the rod and the reeled-in line without capacity for producing an audible signal during the silent and clean removal of a fish from the line and hook re-baiting.

2. Fishing equipment as set forth in claim 1 which further includes means for distinctively adjusting the tone of the signalling device.

* * * * *